(12) United States Patent
Yoshikawa (10) Patent No.: US 10,417,101 B2
(45) Date of Patent: Sep. 17, 2019

(54) FAULT MONITORING DEVICE, VIRTUAL NETWORK SYSTEM, AND FAULT MONITORING METHOD

(71) Applicant: NEC CORPORATION, Tokyo (JP)

(72) Inventor: Naoya Yoshikawa, Tokyo (JP)

(73) Assignee: NEC CORPORATION, Minato-Ku, Tokyo (JP)

( * ) Notice: Subject to any disclaimer, the term of this patent is extended or adjusted under 35 U.S.C. 154(b) by 122 days.

(21) Appl. No.: 15/547,993

(22) PCT Filed: Dec. 10, 2015

(86) PCT No.: PCT/JP2015/084672
§ 371 (c)(1),
(2) Date: Aug. 1, 2017

(87) PCT Pub. No.: WO2016/125387
PCT Pub. Date: Aug. 11, 2016

(65) Prior Publication Data
US 2018/0024898 A1    Jan. 25, 2018

(30) Foreign Application Priority Data
Feb. 6, 2015 (JP) .................... 2015-021838

(51) Int. Cl.
*G06F 11/00* (2006.01)
*G06F 11/20* (2006.01)
(Continued)

(52) U.S. Cl.
CPC ...... *G06F 11/2023* (2013.01); *G06F 11/1484* (2013.01); *H04L 41/065* (2013.01);
(Continued)

(58) Field of Classification Search
CPC ............ G06F 11/1484; G06F 11/2023; H04L 41/065; H04L 41/0654; H04L 69/40
See application file for complete search history.

(56) References Cited

U.S. PATENT DOCUMENTS

| | | | | |
|---|---|---|---|---|
| 5,989,060 A | * | 11/1999 | Coile ................. | G06F 11/2005 439/489 |
| 6,108,300 A | * | 8/2000 | Coile ................. | G06F 11/2005 340/2.9 |

(Continued)

FOREIGN PATENT DOCUMENTS

| | | |
|---|---|---|
| JP | 10-303897 A | 11/1998 |
| JP | 2010-086516 A | 4/2010 |
| JP | 2012-38028 A | 2/2012 |

OTHER PUBLICATIONS

K. Kawashima et al., "Evaluating Integrated Monitoring Method for Cloud Infrastructure", IEICE Technical Report, May 2, 2013, pp. 145-150, vol. 113, No. 23.

(Continued)

*Primary Examiner* — Joshua P Lottich
(74) *Attorney, Agent, or Firm* — Sughrue Mion, PLLC (57) ABSTRACT

A fault monitoring device includes a notice reception part configured to receive a notice indicating occurrence of faults from a virtual network device, and a recovery process part configured to carry out a recovery process for one device having the highest priority of fault response among the virtual network device producing the notice, a physical device implementing the virtual network device, and another virtual network device involved in dependency with the virtual network device.

8 Claims, 4 Drawing Sheets

(51) Int. Cl.
   *H04L 12/24*    (2006.01)
   *G06F 11/14*    (2006.01)
   *H04L 29/14*    (2006.01)

(52) U.S. Cl.
   CPC .......... *H04L 41/0654* (2013.01); *H04L 69/40* (2013.01); *G06F 2201/805* (2013.01); *G06F 2201/815* (2013.01)

(56) References Cited

U.S. PATENT DOCUMENTS

2010/0211829 A1  8/2010  Ziskind et al.
2014/0059380 A1  2/2014  Krishnan et al.

OTHER PUBLICATIONS

International Search Report for PCT/JP2015/084672 dated Feb. 16, 2016 [PCT/ISA/210].
Communication dated Dec. 1, 2017 from the European Patent Office in counterpart application No. 15881204.0.

\* cited by examiner

FAULT MONITORING DEVICE, VIRTUAL NETWORK SYSTEM, AND FAULT MONITORING METHOD

CROSS REFERENCE TO RELATED APPLICATIONS

This application is a National Stage of International Application No. PCT/JP2015/084672, filed on Dec. 10, 2015, which claims priority from Japanese Patent Application No. 2015-021838, filed on Feb. 6, 2015, the contents of all of which are incorporated herein by reference in their entirety.

TECHNICAL FIELD

The present invention relates to a fault monitoring device, a virtual network system, and a fault monitoring method.

BACKGROUND ART

Recently, virtual network systems such as NFV (Network Functions Virtualization) have been proposed to build network environments. Virtual network systems allow virtual devices implemented in physical devices to carry out processing as network devices, thus realizing virtualization of networks. Hereinafter, virtual devices for executing processing as network devices will be referred to as virtual network devices.

Patent Literature 1 discloses a technology specifying fault locations causing faults based on fault information detected by multiple network devices in a physical network system.

CITATION LIST

Patent Literature

Patent Literature 1: Japanese Patent Application Publication No. H10-303897

SUMMARY OF INVENTION

Technical Problem

It is possible to implement appropriate recovery processes based on the technology disclosed in Patent Literature 1 in a physical network system.

In some cases, it is not possible to implement appropriate recovery processes based on the technology disclosed in Patent Literature 1. Due to a failure to detect hardware faults with virtual network devices, for example, physical devices would likely detect hardware faults as software faults occurring in virtual network devices. In addition, it may not be possible to implement appropriate recovery processes since a management device is unable to detect any faults when it manages dependency that redundant functions of virtual network devices are installed in other virtual network devices.

The present invention aims to solve the aforementioned problem by providing a fault monitoring device, a virtual network system, a fault monitoring method and a program.

Solution to Problem

The present invention provides a fault monitoring device including a notice reception part configured to receive a notice indicating the occurrence of faults from a virtual network device; and a recovery process part configured to carry out a recovery process for one device having the highest priority of fault response among the virtual network device producing the notice, a physical device implementing the virtual network device, and another virtual network device involved in dependency with the virtual network device.

The present invention provides a virtual network system including a physical device implementing a virtual network device and the aforementioned fault monitoring device.

The present invention provides a fault monitoring method including a step of receiving a notice indicating the occurrence of faults from a virtual network device, and a step of carrying out a recovery process for one device having the highest priority of fault response among the virtual network device producing the notice, a physical device implementing the virtual network device, and another virtual network device involved in dependency with the virtual network device.

The present invention provides a program that causes a computer to implement a notice reception part configured to receive a notice indicating the occurrence of faults from a virtual network device, and a recovery process part configured to carry out a recovery process for one device having the highest priority of fault response among the virtual network device producing the notice, a physical device implementing the virtual network device, and another virtual network device involved in dependency with the virtual network device.

Advantageous Effects of Invention

According to the present invention, a fault monitoring device is able to implement an appropriate recovery process in a virtual network system.

DESCRIPTION OF EMBODIMENTS

Hereinafter, embodiments will be described in detail with reference to the drawings.

Figure 1:
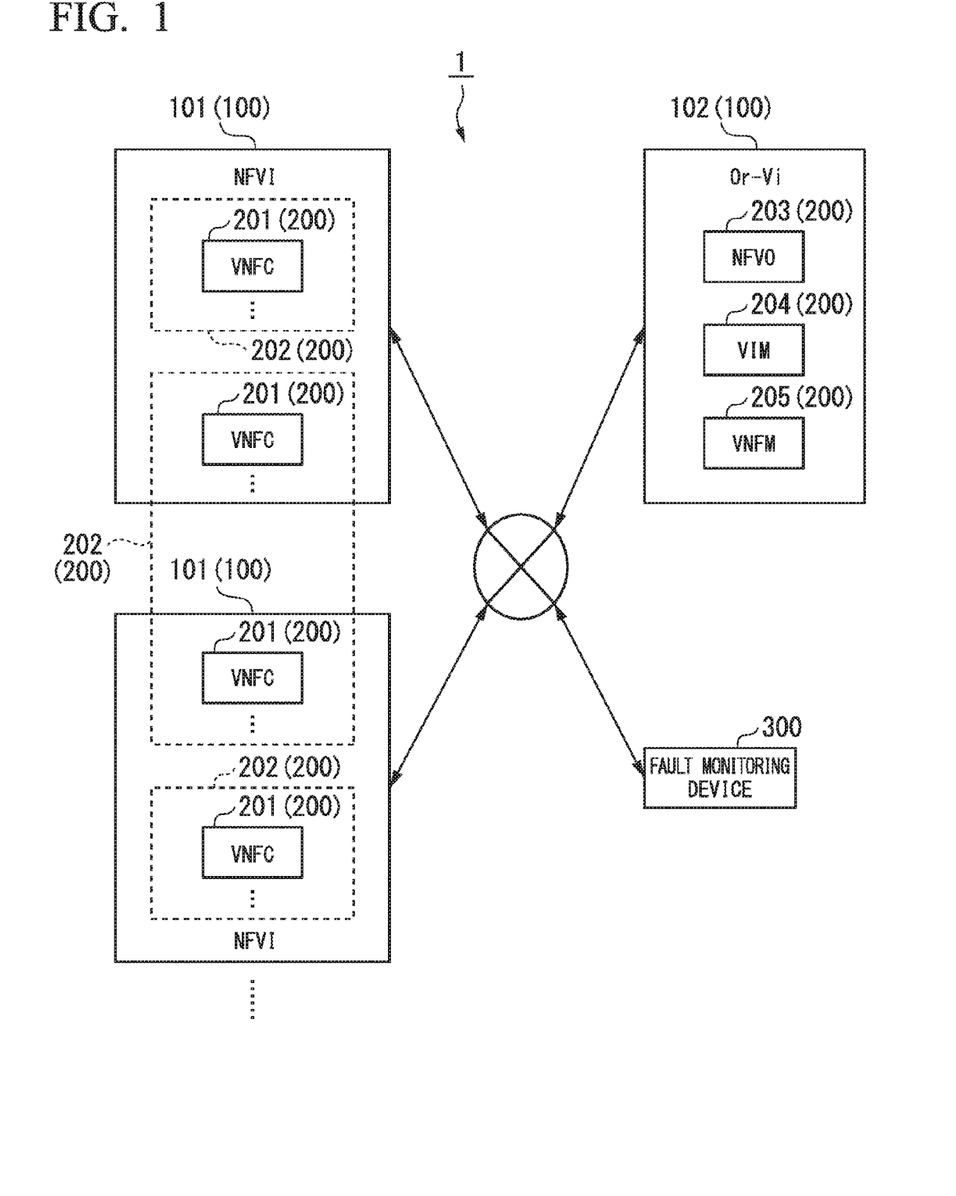
FIG. 1 is a block diagram showing the configuration of a virtual network system according to one embodiment.

FIG. 1 is a block diagram diagrammatically showing the configuration of a virtual network system according to one embodiment. The present embodiment refers to the situation that a virtual network system 1 adopts an NFV architecture. In this connection, the virtual network system 1 according to another embodiment may be realized using any configurations other than the NFV architecture.

The virtual network system 1 according to the present embodiment includes a plurality of NFVIs (Network Functions Virtualization Infrastructure) 101, an Or-Vi (Orchestrator-Virtualized Infrastructure Manager) 102, and a fault monitoring device 300.

The NFVI 101 is a physical device implementing one or multiple VNFCs (Virtual Network Function Component) 201.

The VNFC 201 is a virtual device implementing part of a VNF (Virtual Network Function) 202.

The VNF 202 is a virtual device implanting functions of network devices such as MME (Mobility Management Entity), S-GW (Serving Gateway), and P-GW (PDN Gateway). In this connection, the VNF 202 may be realized using a combination of VNFCs 201 installed in the same NFVI 101, or it may be realized using a combination of VNFCs 201 installed in different NFVIs 101.

The Or-Vi 102 a physical device including an NFVO (NFV Orchestrator) 203, a VIM (Virtualized Infrastructure Manager) 204, and a VNFM (VNF Manager) 205, which are virtual network devices used to manage the VNFC 201 and the VNF 202.

The present embodiment will be descried with respect to the situation that the NFVO 203, the VIM 204, and the VNFM 205 are installed in a single Or-VI 102. In another embodiment of the virtual network system 1 including multiple sets of Or-Vi 102, it is possible to install the NFVO 203, the VIM 204, and the VNFM 205 in different sets of Or-Vi 102.

The fault monitoring device 300 monitors faults occurring in the virtual network system 1.

The NFVI 101, the Or-Vi 102, and the fault monitoring device 300 are mutually connected together through physical networks.

Hereinafter, the NFVI 101 and the Or-Vi 102 serving as devices including hardware elements will be collectively referred to as physical devices 100, while the VNFC 201, the VNF 2012, the NFVO 203, the VIM 204, and the VNFM 205 serving as virtual devices realized using physical devices 100 will be collectively referred to as virtual network devices 200.

Figure 2:
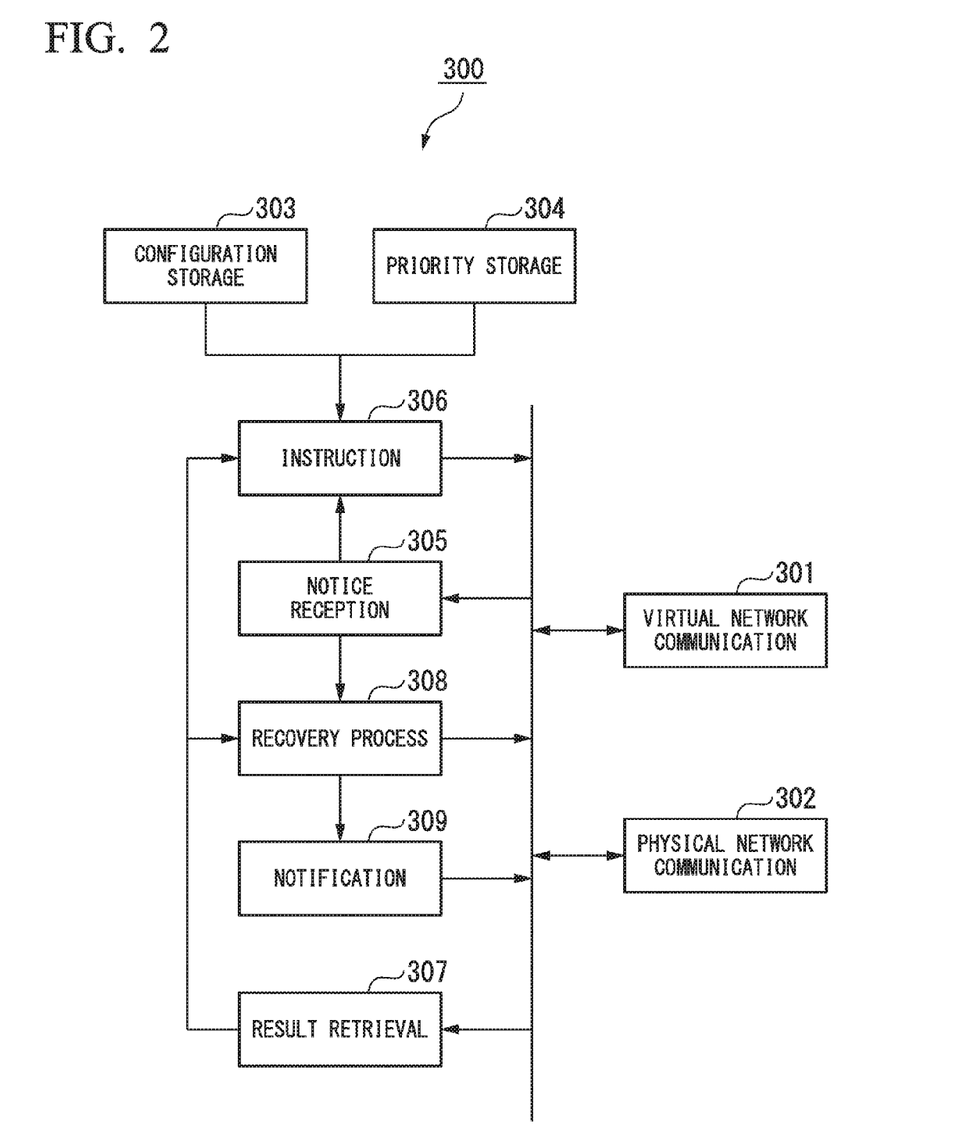
FIG. 2 is a block diagram diagrammatically showing the configuration of a fault monitoring device according to one embodiment.

FIG. 2 is a block diagram diagrammatically showing the configuration of the fault monitoring device 300 (which can be realized using software) according to one embodiment.

The fault monitoring device 300 includes a virtual network communication part 301, a physical network communication part 302, a configuration storage unit 303, a priority storage unit 304, a notice reception part 305, an instruction part 306, a result retrieval part 307, a recover process part 308, and a notification part 309.

The virtual network communication part 301 communicates with the virtual network devices 200 through virtual networks.

The physical network communication part 302 communicates with the physical devices 100 through physical networks.

The configuration storage unit 303 stores a virtual layer table, which stores correlation between the virtual network devices 200 involved in dependency, and a mapping table which stores correlation between the virtual network devices 200 and the physical devices 100 implementing the virtual network devices 200.

As examples of dependency among the virtual network devices 200, it is possible to mention the relationship between the VNF 202 and the VNFC 201 configuring the VNF 202, the relationship between the VNF 202 and the NFVO 203, VIM 204, or the VNFM 205 for managing the VNF 202, and the relationship between the VNFs 202 demonstrating redundant functions.

That is, the virtual layer table is a table configured to store the correlation between one virtual network device 200 and another virtual network device 200 involved in dependency with one virtual network device 200.

The priority storage unit 304 stores combinations of device types and fault types in correlation with priorities of fault responses against those combinations. A manager of the virtual network system 1 may arbitrary set the order of priorities stored on the priority storage unit 304.

Generally speaking, it is preferable that the order of priority in the virtual network devices 200 be lower than the order of priority in the physical devices 100. This may cope with errors occurring in the virtual network devices 200 so as to preferentially detect faults occurring in the physical devices 100 implementing the virtual network devices 200.

For example, the priority storage unit 304 stores hardware faults in NFVIs 101, network faults in NFVIs 101, software faults in NFVIs 101, hardware faults in VNFs 202, network faults in VNFs 202, and software faults in VNFs 202 in a higher order of priority.

Generally, the virtual network device 200 does not detect any hardware faults, but it may detect hardware faults under usage of virtual resources directly accessing physical resources (e.g. usage of PCI PassThrough (i.e. a technology of interconnecting a PCI (Peripheral Component Interconnect) device of a host system to virtual guest).

It is preferable that the priority of fault concerning a virtual network that has been already established in connection by a user be higher than the priority of fault concerning a virtual network that has not been established in connection by a user (e.g. a session establishment stage). This setting is needed to preferentially detect faults that may likely damage user's convenience.

The notice reception part 305 receives notices of faults from the virtual network device 200 and the physical device 100.

The instruction part 306 sends instructions to detect presence/absence of faults to the virtual network device 200 and the physical device 100.

The result retrieval part 307 retrieves results of detecting faults according to instructions.

The recovery process part 308 carries out recovery processes for the virtual network device 200 and the physical device 100. Specifically, the recovery process part 308 sequentially carries out recovery processes for the virtual network device 200 and the physical device 100 in the order counted from one device having the highest priority.

The notification part 309 notifies the occurrence of fault to the virtual network device 200 and the physical device 100 involved in dependency with one device implementing a recovery process.

Next, the operation of the fault monitoring device 300 according to the present embodiment will be described below.

Figure 3:
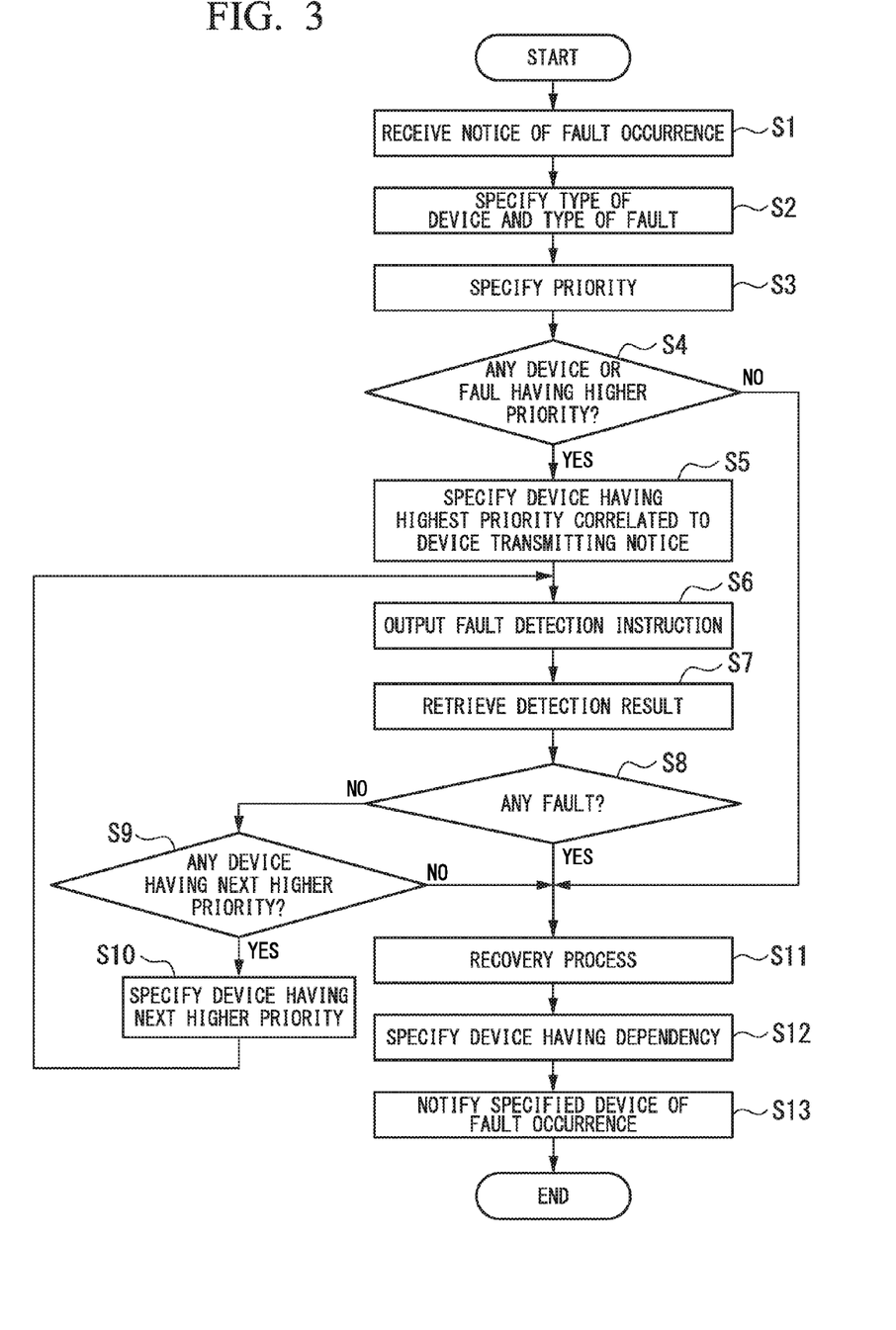
FIG. 3 is a flowchart showing a procedure for a fault monitoring method according to one embodiment.

FIG. 3 is a flowchart showing the procedure of a fault monitoring method according to one embodiment.

Upon detecting a fault, the virtual network device 200 or the physical device 100 produces a notice indicating the occurrence of the fault thereof. The notice includes an identification of one device causing its fault and the type of the fault. The notice reception part 305 of the fault monitoring device 300 receives a notice indicating the occurrence of fault from the virtual network device 200 or the physical device 100 (step S1).

Next, the instruction part 306 specifies one device causing its fault and the type of the fault based on the notice received by the notice reception part 305 (step S2).

Next, the instruction part 306 specifies the type of one device producing the notice and the priority of the fault response correlated to the fault of one device with reference to the priority storage unit 304 (step S3). Next, the instruction part 306 determines the presence/absence of any combination of the type of fault and the type of device correlated to a higher priority than the above priority (step S4).

Due to presence of any combination of the type of fault and the type of device correlated to a higher priority (step S4: YES), the instruction part 306 specifies a device having the highest priority of fault response among devices correlated to the device receiving the notice with reference to the virtual layer table and the mapping table stored on the configuration storage unit 303 (step S5). Next, the instruction part 306 sends to the specified device an instruction to detect a fault whose type is correlated to its priority (step S6).

Thus, the device specified by the fault monitoring device 300 carries out a fault detecting process for the designated type of fault so as to transit the detection result to the fault monitoring device 300.

The result retrieval part 307 of the fault monitoring device 300 retrieves the result of detecting faults from the device specified by the instruction part 306 (step S7), Then, the result retrieval part 307 determines whether or not the detection result indicates presence of faults (step S8).

When the detection result indicates absence of faults (step S8: NO), the instruction part 306 determines presence/absence of any device correlated to a higher priority next to the lately-specified priority with reference to the priority storage unit 304 and the configuration storage unit 303 (step S9), Due to presence of any device correlated to the next higher priority (step S9: YES), the instruction part 306 specifies the device correlated to the next higher priority (step S10), and then it sends an instruction to detect faults to the device in step S6.

That is, the instruction part 306 sequentially sends instructions to detect presence/absence of faults to the devices, which are stored on the configuration storage unit 303 in correlation with the device receiving the notice, in the order counting from a higher order of fault response.

When the detection result indicates the occurrence of faults in step S8 (step S8: YES), the recovery process part 308 carries out a recovery process for the device transmitting the detection result (step S11).

When the step S4 indicates the non-occurrence of faults or non-existence of a device having a higher priority than the priority of the device transmitting a notice (step S4: NO), or when the step S9 indicates non-existence of a device having a next higher priority lower than the priority of a device transmitting its detection result (step S9: NO), the recovery process part 308 carries out a recovery process for the device specified in step S2 (step S11).

As examples of recovery processes, it is possible to mention a process for rebooting the virtual network device 200 or the physical device 100 and a process for activating the virtual network device 200 with the other physical device 100.

Next, the notification part 309 specifies the virtual network device 200 having dependency with the device subjected to recovery process with reference to the virtual layer table stored on the configuration storage unit 303 (step S12). Next, the notification part 309 notifies the specified virtual network device 200 of the occurrence of faults (step S13).

That is, the notification part 309 notifies the occurrence of faults to the other constituent element other than a group involving a device causing faults as its constituent element. As examples of groups involving devices causing faults as their constituent elements, it is possible to mention the VFN 202 including multiple VFNCs 201 under management of the VNFM 205 and a redundant configuration including multiple VNFs 202 under management of the NFVO 203. Thus, it is possible to secure the function of each group since the other virtual network device 200 belonging to each group executes a substitution process for the virtual network device causing faults.

As described above, the fault monitoring device 300 of the present embodiment carries out a recovery process for one device having a higher priority of fault response among the physical device 100 implementing a device receiving a notice of fault and the virtual network device 200 involved in dependency with the device. Thus, the fault monitoring device 300 may try to carry out a recovery process for any device causing faults.

In the virtual network system 1, a plurality of device, relating to a certain device causing faults, may detect those faults. When a fault occurs in the NIC (Network Interface Card) of the NFVI 101, for example, the fault can be detected by a plurality of devices such as the NFVI 101, the VNFC 201 implemented by the NFVI 101, and the other VNFC 201 connected to the VNFC 201 through a virtual network.

At this time, a notice of fault from the NFVI 101, i.e. a source originating its fault, may not always reach the fault monitoring device 300 at first. When the fault monitoring device 300 tries to carry out recovery processes in the order of receiving each notice of fault, it may carry out recovery processes such as rebooting the VNFC 201 and reconfiguring a virtual network, however, those recovery processes may not eliminate faults due to a cause of fault laid in the NFVI 101.

In addition, it is not possible to use the VNFC 201 during rebooting of the VNFC 201 while it is not possible to sue a virtual network during reconfiguration of the virtual network; hence, the above recovery process may reduce availability of the virtual network.

In contrast, the fault monitoring device 300 of the present embodiment specifies a device causing faults based on a notice of fault so as to carry out a recovery process for the device. Thus, it is possible for the fault monitoring device 300 to recover the virtual network system 1 while minimizing a reduction of availability in the virtual network system 1.

In addition, the fault monitoring device 300 of the present embodiment sends an instruction to detect faults to the other device that is related to a device causing faults but that has not detect faults. Thus, it is possible to rapidly carry out a recovery process for fixing faults occurred in a device by temporarily executing a fault detection process with the device that has not detected faults.

In this connection, the fault monitoring device 300 of another embodiment may not necessarily produce an instruction to detect faults. In this case, the fault monitoring device 300 may wait to hold a recovery process until the other device having a higher priority starts to periodically execute a fault detection process.

In addition, the fault monitoring device 300 of the present embodiment notifies the occurrence of faults to the other device involved in dependency with a device causing faults. Thus, it is possible to implement a procedure establishing a redundancy configuration for a device causing faults with the other device involved in dependency with the device causing faults.

Generally speaking, each cloud system is made such that a single VM (Virtua Machine) is configured using a single application; hence, it does not manage fault information considering dependency between VMs.

Heretofore, one embodiment is described in detail with reference to the drawings; however, concrete configurations should not be limited to the foregoing ones, and therefore it is possible to provide various changes in design.

For example, the foregoing embodiment adopts the configuration storage unit 303 that stores both the virtual layer table and the mapping table; but this is not a restriction. For example, another embodiment may adopt the configuration storage unit 303 that stores either the virtual layer table or the mapping table.

When the configuration storage unit 303 stores the virtual layer table, it is possible for the fault monitoring device 300 to appropriately carry out a recovery process with respect to the other virtual network device 200, involved in dependency, which causes faults.

When the configuration storage unit 303 stores the mapping table, it is possible for the fault monitoring device 300 to appropriately carry out a recovery process with respect to the physical device 100, implementing at least the virtual network device 200, which causes faults.

Moreover, the fault monitoring device 300 of the foregoing embodiment adopts the configuration storage unit 303 and the priority storage unit 304; but this is not a restriction. For example, the fault monitoring device 300 according to another embodiment does not adopt the configuration storage unit 303 and the priority storage unit 304, and therefore it may carry out the foregoing process based on information stored in another device (e.g. a database device).

<Basic Configuration>

Figure 4:
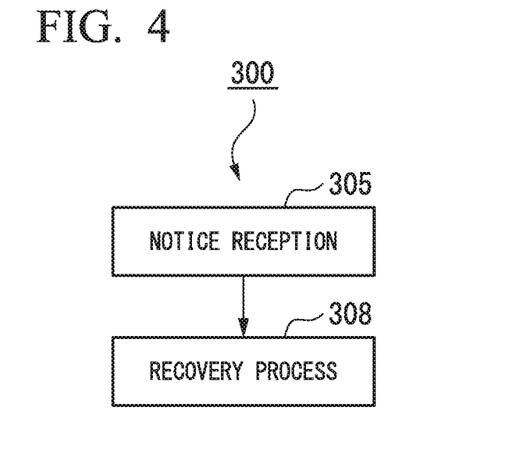
FIG. 4 is a block diagram diagrammatically showing a basic configuration of the fault monitoring device.

FIG. 4 is a block diagram diagrammatically showing the basic configuration of a fault monitoring device according to the present invention.

The foregoing embodiment refers to one embodiment of the fault monitoring device 300 having the configuration shown in FIG. 2, but the basic configuration of the fault monitoring device 300 is shown in FIG. 4.

That is, the fault monitoring device 300 has the basic configuration including the notice reception part 305 and the recovery process part 308.

The notice reception part 305 receives a notice indicating occurrence of faults from the virtual network device 200.

The recovery process part 308 carries out a recovery process for one device having the highest priority of fault response among the virtual network device 200 receiving a notice, the physical device 100 implementing the virtual network device 200, and the other virtual network device 200 involved in dependency with the virtual network device 200.

Thus, the fault monitoring device 300 is able to appropriately carry out a recovery process in the virtual network system 1.

Figure 5:
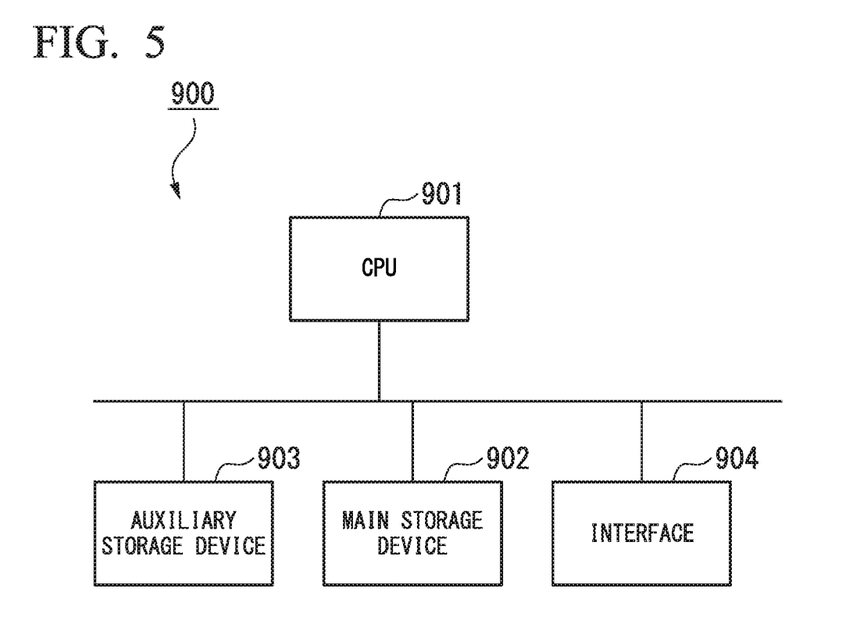
FIG. 5 is a block diagram diagrammatically showing a computer configuration according to at least one embodiment.

FIG. 5 is a block diagram diagrammatically showing the configuration of a computer according to at least one embodiment.

A computer 900 includes a CPU 901, a main storage device 902, an auxiliary storage device 903, and an interface 904.

The aforementioned fault monitoring device 300 is installed in the computer 900. The operations concerning the above processing parts are implemented using programs stored on the auxiliary storage device 903. The CPU 901 reads programs from the auxiliary storage device 903 so as to load into the main storage device 902, and therefore the aforementioned processes are executed according to programs. In addition, the CPU 901 secures storage areas, corresponding to the aforementioned storage units, in the main storage unit 902 according to programs.

In at least one embodiment, the auxiliary storage device 903 is an example of a non-transitory tangible medium. As examples of non-transitory tangible media, it is possible to mention magnetic disks, magneto-optic disks, CD-ROM, DVD-ROM, and semiconductor, which can be connected to the computer 900 through the interface 904. When programs are delivered to the computer 900 through communication lines, the computer 900 receiving programs delivered thereto may load programs into the main storage device 902 so as to execute the aforementioned processes.

Programs may achieve part of the foregoing functions.

Alternatively, programs may indicate differential tiles (or differential programs), which are combined with other programs pre-installed in the auxiliary storage device 903 so as to achieve the foregoing functions.

The present application claims the benefit of priority on Japanese Patent Application No. 2015-21838 filed on Feb. 6, 2015, the subject matter of which is hereby incorporated herein by reference.

INDUSTRIAL APPLICABILITY

According to the present invention, the fault monitoring device is able to appropriately carry out a recovery process in a virtual network system.

REFERENCE SIGNS LIST 1 virtual network system
100 physical device
200 virtual network device
300 fault monitoring device
301 virtual network communication part
302 physical network communication part
303 configuration storage unit
304 priority storage unit
305 notice reception part
306 instruction part
307 result retrieval part
308 recovery process part
309 notification part

The invention claimed is:

1. A fault monitoring device adapted to a virtual network system including a plurality of physical devices having a plurality of virtual network devices, the fault monitoring device comprising:
a notice reception part configured to receive a notice of a fault occurrence from a virtual network device;
a configuration storage unit configured to store a correlation between the plurality of virtual network devices involved in dependency and a correlation between the plurality of physical devices and the plurality of virtual network devices;
a priority storage unit configured to store a priority of fault response for each combination between a type of fault and a type of each device among the plurality of physical devices and the plurality of virtual network devices; and
a recovery process part configured to carry out a recovery process for a specific device having a highest priority of fault response to the virtual network device indicating the fault occurrence among the plurality of physical devices and the plurality of virtual network devices with reference to the configuration storage unit and the priority storage unit.

2. The fault monitoring device according to claim 1, further comprising an instruction part configured to send an instruction to detect the fault occurrence to each device by referring to the configuration storage unit, and a result retrieval part configured to retrieve a detection result concerning the fault occurrence from each device designated by the instruction part, wherein the recovery process part carries out the recovery process for the specific device having the highest priority of fault response by referring to the priority storage unit.

3. The fault monitoring device according to claim 1, wherein a higher priority is assigned to the physical device while a lower priority is assigned to the virtual network device.

4. The fault monitoring device according to claim 1, wherein the priority of fault response is increased in an order of a hardware fault, a network fault, and a software fault on the priority storage unit.

5. A virtual network system comprising:
a plurality of physical devices implementing a plurality of virtual network devices (200); and
a fault monitoring device including the notice reception part, the configuration storage unit, the priority storage unit, and the recovery process part according to claim 1.

6. A fault monitoring method adapted to a virtual network system including a plurality of physical devices having a plurality of virtual network devices, the fault monitoring method comprising:

receiving a notice of a fault occurrence from a virtual network device;

determining a priority of fault response for each combination between a type of fault and a type of each device among the plurality of physical devices and the plurality of virtual network devices with reference to a correlation between the plurality of virtual network devices involved in dependency and a correlation between the plurality of physical devices and the plurality of virtual network devices;

detecting the fault occurrence indicated by the virtual network device among the plurality of virtual network devices;

designating a specific device having a highest priority of fault response to the virtual network device indicating the fault occurrence among the plurality of physical devices and the plurality of virtual network devices; and carrying out a recovery process for the specific device.

7. The fault monitoring method according to claim 6, wherein a higher priority is assigned to the physical device while a lower priority is assigned to the virtual network device.

8. The fault monitoring method according to claim 6, wherein the priority of fault response is increased in an order of a hardware fault, a network fault, and a software fault.

* * * * *